United States Patent Office 3,502,704

Patented Mar. 24, 1970

3,502,704
POLYISOCYANATO SILANES AND SILOXANES

Robert L. McKellar, Midland, Mich., assignor to Dow Corning Corporation, Midland, Mich., a corporation of Michigan No Drawing. Continuation-in-part of application Ser. No. 472,317, July 15, 1965. This application Feb. 13, 1969, Ser. No. 799,090

Int. Cl. C07f 7/04, 7/18

U.S. Cl. 260—448.8 22 Claims

ABSTRACT OF THE DISCLOSURE

New polyisocyanato silanes and siloxanes are disclosed. These compounds are useful in the preparation of urethane rubbers, resins and varnishes. The silanes containing hydrolyzable groups are particularly useful as internal and external primers for promoting adhesion of urethane sealants and caulks to various surfaces.

This application is a continuation-in-part of application Ser. No. 472,317 filed July 15, 1965 and now abandoned.

This invention relates to polyisocyanato silanes and siloxanes, that is, silanes and siloxanes containing more than one isocyanato group per substituent on the silicon atom.

More specifically this invention relates to a silane having the general formula $$(RO)_{3-x}\overset{\displaystyle R'_x}{\overset{|}{Si}}—A$$

wherein

R is a hydrocarbon radical free of aliphatic unsaturation,
R′ is a monovalent hydrocarbon radical free of aliphatic unsaturation,
$x$ has a value of from 0 to 3, and
A is a radical attached to the silicon atom via a silicon-carbon bond and which contains at least two isocyanato groups, there being at least two aliphatic carbon atoms whereby the A radical is attached to the silicon atom, and there being at least one $$—O\overset{O}{\overset{\|}{C}}NH— \text{ or } —S\overset{O}{\overset{\|}{C}}NH—$$

linkage between the carbon atoms linking the A group to the silicon atom and the isocyanato groups of the A radical.

This invention also relates to homopolymeric and copolymeric siloxanes containing at least one unit of the general formula $$O_{\frac{3-y}{2}}\overset{\displaystyle R'y}{\overset{|}{Si}}—A$$

wherein R′ and A are as defined above and $y$ has a value of from 0 to 2. In addition to siloxane units of the foregoing type, the copolymeric siloxanes can also contain conventional siloxane units of the general formula $$R''_nSiO_{\frac{4-n}{2}}$$

wherein R″ is selected from the group consisting of monovalent hydrocarbon and monovalent halogenated hydrocarbon radicals free of aliphatic unsaturation, and $n$ has a value from 0 to 3.

In the above formulae, R and R′ can be any hydrocarbon radicals free of aliphatic unsaturation. Thus R and R′ can be, for example, alkyl, cycloalkyl, aryl, alkaryl or aralkyl groups. Specific examples of such groups include the methyl, ethyl, propyl, isopropyl, butyl, amyl, octyl, decyl, dodecyl, octadecyl, myricyl, cyclopentyl, cyclohexyl, phenyl, xenyl, naphthyl, tolyl, xylyl, mesityl, ethylphenyl, benzyl, phenylethyl and the beta-phenylpropyl radicals. Preferred R and R′ groups are those containing from 1 to 6 carbon atoms, especially the alkyl groups.

In the above formulae, A can be any radical attached to the silicon atom via a silicon-carbon (Si—C) bond and which contains at least two isocyanato groups, there being at least two aliphatic carbon atoms whereby the A radical is attached to the silicon atom, and there being at least one $$—O\overset{O}{\overset{\|}{C}}NH— \text{ or } —S\overset{O}{\overset{\|}{C}}NH—$$

linkage between the carbon atoms linking the A group to the silicon atom and the isocyanato groups of the A radical. So long as the A radical has the foregoing essential characteristics, the rest of the radical can have essentially any other configuration and combination of groupings that are compatible with the isocyanato groups. By way of illustration, the A radical could basically be a hydrocarbon radical, or it could contain linkages such as the ether, thioether, ester, thioester, urethane and thiourethane linkages. In addition to such linking groups, A can of course contain any substituent groups (halogens, for example) which are compatible with the isocyanato groups. Specific examples which more clearly illustrate the above will be found in the examples below.

In the above formula, R″ can be any monovalent hydrocarbon or monovalent halogenated hydrocarbon radical which is free of aliphatic unsaturation. Specific examples of such monovalent hydrocarbon radicals are set forth under the description of R and R′ above. In addition, R″ can be any of the halogenated radicals which correspond to the hydrocarbon radicals already described. Thus, specifically, R″ can also be a halogenated alkyl radical such as a $CF_3CH_2CH_2$—, $CF_3CF_2CH_2CH_2$—, $CF_3CF_2CF_2CH_2CH_2$—, $CH_2ClCH_2CH_2$—, $$CF_3CF_2CF(CF_3)CH_2CH_2—$$

$(CF_3)_2CHCH_2$— or a $C_7F_{15}CH_2CH_2$— radical; a halogenated cycloalkyl radical such as a chloro- or bromocyclohexyl radical; a halogenated aryl radical such as a bromophenyl, dichlorophenyl, chloronaphthyl, pentachloroxenyl or a perfluorophenyl radical; a halogenated alkaryl radical such as the $\alpha,\alpha,\alpha$-trifluorotolyl radical; a halogenated aralkyl radical such as the dichlorobenzyl radical. Preferred R″ radicals are those containing from 1 to 18 carbon atoms.

There are numerous ways in which the silanes and siloxanes of this invention can be prepared. One particularly useful preparation is the reaction of a diisocyanate with a silane or siloxane containing a substituent having two groups, such as the hydroxy or mercapto groups, which are reactive with the isocyanato group. Another similar preparation is the reaction of an isocyanate containing more than two isocyanato groups with a silane or siloxane containing a substituent having only a single isocyanato reactive group. Still another method of preparation is the addition of a polyisocyanate containing aliphatic unsaturation to a silicon-bonded hydrogen atom in the presence of a catalyst such as platinum. Various other methods of preparation will now be obvious to those skilled in the art including techniques involving the formation of the isocyanato groups from other groups present on the silicon substituents, for example by the conversion of cyano or amino substituents to isocyanato groups by known techniques.

The silanes and siloxanes of this invention have numerous uses. For example, they can be used in the preparation of urethane rubbers, resins and varnishes. Because the materials of this invention contain more than one isocyanato group, they are of special interest in uses where a non-chain terminating material is desirable, for example in polymers. The silanes which contain the hydrolyzable RO groups, particularly those containing three such groups, are very useful as primers, either internal or external, for promoting adhesion of urethane sealants or caulks to various surfaces. Other uses of the silanes and siloxanes of this invention will be apparent to those skilled in the art.

It will be understood by those skilled in the art that whenever reference has been or is made herein to the polyisocyanates, that such reference is intended to include the commercially available isomers and mixtures as well as the pure compounds even though for the sake of simplicity the discussion, examples and claims are couched in terms of the pure compounds. Thus, in the examples, while a commercially available material has been employed (the toluene diisocyanate for example is a 80–20 mixture of the 2,4 and 2,6-isomers) the formula shown for the product is only that which is known to be or believed to represent the predominate isomer.

Now in order that those skilled in the art may better understand how the present invention can be practiced, the following examples are given by way of illustration and not by way of limitation.

EXAMPLE 1

To a 250 ml., three-necked flask equipped with a reflux condenser, stirrer, thermometer and addition funnel, there was added 34.8 g. of toluene diisocyanate and 71.3 g. of benzene. This mixture was heated to 65° C. and then 0.0143 g. of dibutyltin diacetate was added. Next 36.5 g. of $(CH_3O)_3Si(CH_2)_3S(CH_2)_3OCH_2C(CH_2OH)_2C_2H_5$ was added via the funnel, causing an exotherm, with the temperature rising to 70° C. After the addition of the silane was complete, the mixture was heated at reflux, about 82° C., for 3 hours then cooled and stripped at 105° C. at 50 mm. of mercury pressure to obtain a hazy, viscous yellow fluid. The product was principally

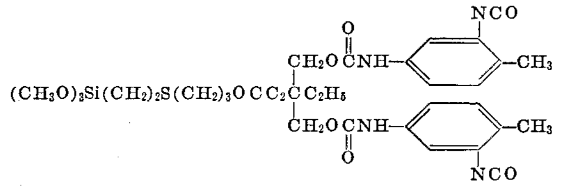

EXAMPLE 2

To a flask there was added 36.54 g. of toluene diisocyanate and 38.5 g. of $$(CH_3O)_3SiCH_2CH(CH_3)CH_2S(CH_2)_3OCH_2C(CH_2OH)_2C_2H_5$$

Then the mixture was quickly heated to 121° C. and held and stirred at this temperature for 35 minutes. The entire reaction was carried out under a nitrogen purge. The product was golden yellow in color and had the formula

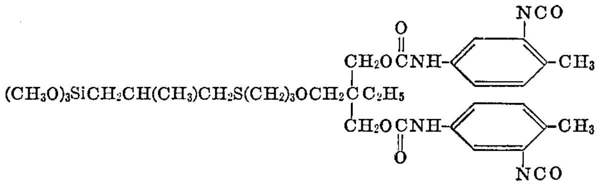

EXAMPLE 3

To a 2 liter, 3-necked flask there was added 348 g. of toluene diisocyanate and 370 g. of $$(CH_3O)_3Si(CH_2)_2S(CH_2)_3OCH_2C(CH_2OH)_2C_2H_5$$

and then the mixture was quickly heated to 137° C. Then the mixture was cooled to 122° C., stirred at this temperature for 35 minutes, and finally cooled to room temperature. The resulting product was

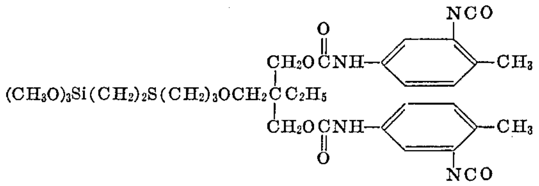

EXAMPLE 4

To a 5 liter, 3-necked flask there was added 1392 g. of toluene diisocyanate and 1024 g. of $$(CH_3O)_3Si(CH_2)_2SCH_2CH(OH)CH_2OH$$

under a nitrogen purge. The mixture was heated to 70° C. at which point the reaction became exothermic. A cold water bath was used to control the temperature to 87° C. When the exotherm subsided, the mixture was heated to about 120° C. and stirred at this temperature for about 1½ hours before cooling it. The mixture was creamy at the start but became clear after about ½ hour of stirring. The product was

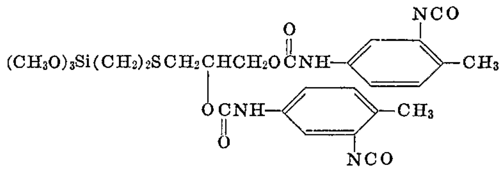

EXAMPLE 5

In a vial there was mixed 5.2 g. of toluene diisocyanate, 9.3 g. toluene and 3.8 g. of

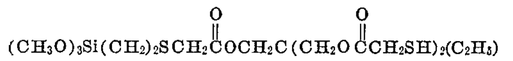

which resulted in a homogeneous solution. Then 1 drop of stannous octoate catalyst was added to the vial and an exothermic reaction took place, the temperature rising to 47° C. The product obtained from this reaction was

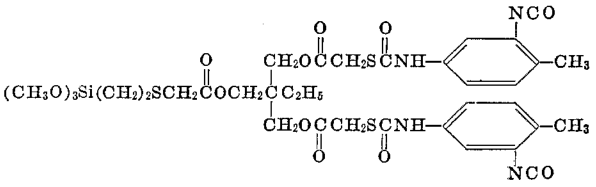

EXAMPLE 6

To a flask containing 149 g. of $$(CH_3O)_3Si(CH_2)_2S(CH_2)_3OCH_2CH(CH_3)(OH)$$

there was added, at room temperature over a 10 minute period, 207 g. of

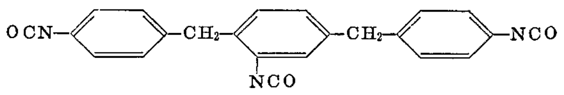

The mixture was then heated to 120° C., held at this temperature for 1 hour, and then cooled. The product obtained was

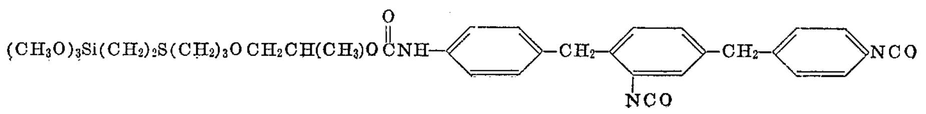

EXAMPLE 7

To a flask there was added 87 g. of toluene diisocyanate and 75 g. of $(CH_3O)_3Si(CH_2)_3OCH_2C(CH_2OH)_2C_2H_5$. This mixture was heated to 120° C., held at this temperature with agitation for ½ hour, and then cooled to room temperature. The product had the formula

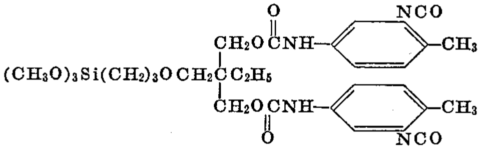

EXAMPLE 8

10.5 g. of diethylene glycol and 0.5 ml. of boron-trifluoride etherate were placed in a flask and then 25 g. of

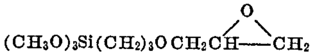

was added with stirring. An exothermic reaction took place. After 5 minutes, 15 ml. of t-butyl alcohol was added to the flask and then 35 g. of toluene diisocyanate added, the addition of the latter also causing an exotherm. The flask contents were heated to 110° to 120° C. for 30 minutes and then cooled to room temperature whereupon a clear, viscous, fluid product was obtained which had the formula

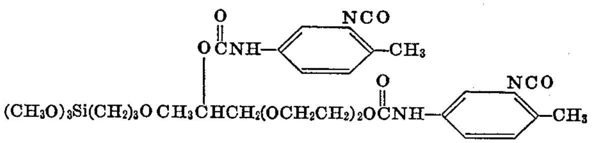

EXAMPLE 9

When the silanes and isocyanates specified below are reacted in accordance with one of the processes set forth in the preceding examples, the indicated product is obtained.

| Silane | Isocyanate | Product |
|---|---|---|
| 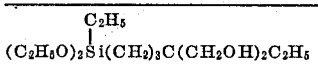 | $OCN(CH_2)_6NCO$ | 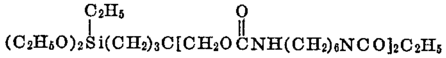 |
| 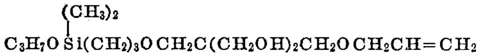 | 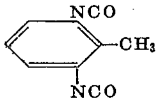 | 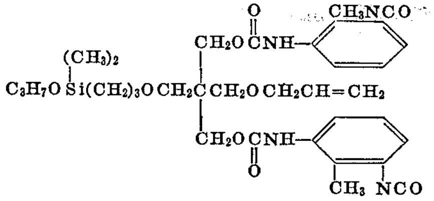 |
| 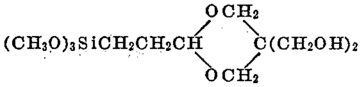 | 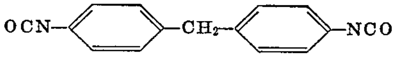 | 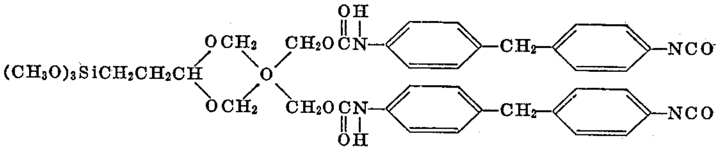 |

| Silane | Isocyanate | Product |
|---|---|---|
| $C_6H_5(CH_3)_2Si(CH_2)_2SCH_2\overset{O}{\overset{\|}{C}}OCH_2C(CH_2O\underset{O}{\underset{\|}{C}}CH_2SH)_3$ | 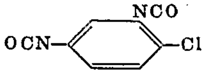 | 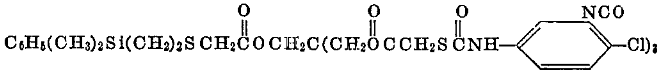 |
| $(C_6H_5O)_3Si(CH_2)_3OCH_2C(CH_2OH)_2C_2H_5$ | 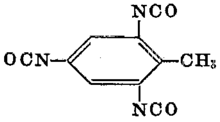 | 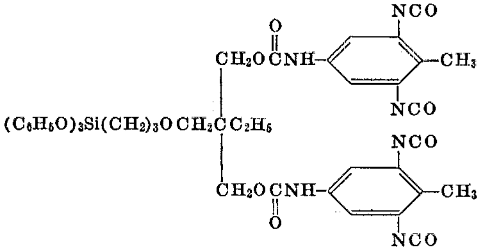 |
| $(CH_3O)_3Si(CH_2)_3OCH_2C(CH_2OH)_3$ | 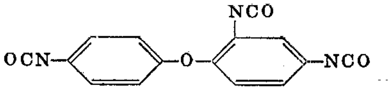 | 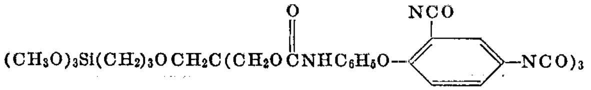 |
| $C_8H_{17}(RH_3)_2Si(CH_2)_2S(CH_2)_3OCH_2C(CH_2OH)_2C_2H_5$ | 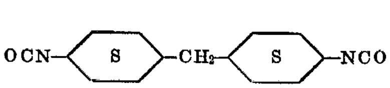 | 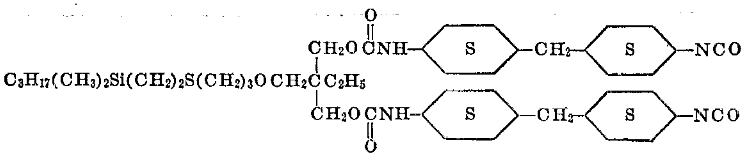 |
| $C_{18}H_{37}(CH_3O)_2Si(CH_2)_3SH$ | 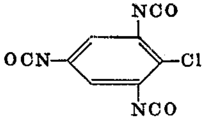 | 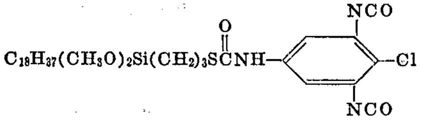 |
| $C_6H_5CH_2(CH_3O)_2Si(CH_2)_3S(CH_2)_3OCH_2C(CH_2OH)_2C_2H_5$ |  | 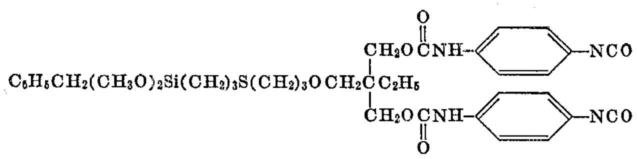 |

EXAMPLE 10

When siloxanes containing the indicated units, and the isocyanates specified below are reacted in accordance with one of the processes set forth in the preceding examples, the siloxane being used in place of the silane, the indicated product is obtained.

| Siloxane Units | Isocyanate | Product |
|---|---|---|
| $C_2H_5(HOCH_2)_2CCH_2O(CH_2)_3S(CH_2)_3SiO_{1/2}$<br>$(CH_3)_2$ | 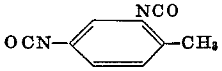 | 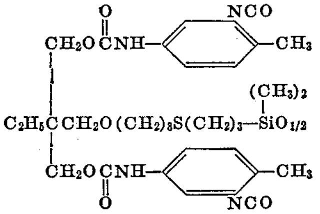 |
| $(CH_3)(C_2H_5)SiO(C_{18}H_{37})(CH_3)_2SiO_{1/2}(HOCH_2CH_2CH_2)(CH_3)SiO$ | 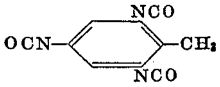 | $(CH_3)(C_2H_5)SiO(C_{18}H_{37})(CH_3)_2SiO_{1/2}$<br>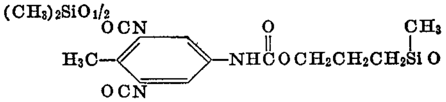 |
| $(CH_3)_2$<br>$(CF_3CH_2CH_2)(CH_3)SiO(CH_3)_2SiO(HOCH_2)_3CCH_2O(CH_2)_3SiO_{1/2}$ | $OCN(CH_3)_5NCO$ | $(CF_3CH_2CH_2)(CH_3)SiO(CH_3)_2SiO$<br>O (CH$_3$)$_2$<br>$[OCN(CH_2)_5NHCOCH_2]_3CCH_2O(CH_2)_3SiO_{1/2}$ |
| $C_3H_7$<br>$(CH_3)_2(H_3CC_6H_4)SiO_{1/2}(HOCH_2)_3CCH_2O(CH_2)_2SiO$ | 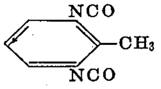 | 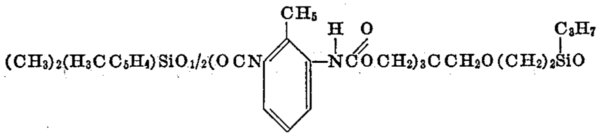 |
| $(C_6H_3Cl_2)(CH_3)SiO(C_{10}H_8)SiO_{3/2}(HSCH_2CH_2)_2$<br>$(CH_3CH_2)C(CH_2)_2S(CH_2)_2SiO_{1/2}$<br>$(CH_3)_2$ | 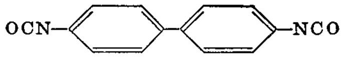 | $(C_6H_3Cl_2)(CH_3)SiO(C_{10}H_8)SiO_{3/2}$<br>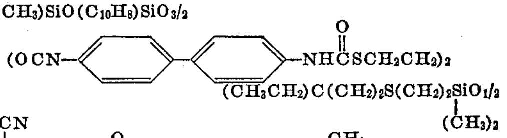 |
| $CH_3$<br>$(HSCH_2)_5CCH_2S(CH_2)_4SiO$ | 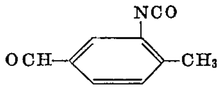 | 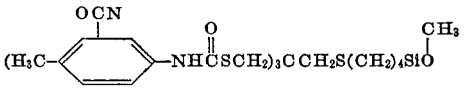 |
| $(CH_3)_2$<br>$SiO_2(CH_3)_3SiO_{1/2}HO(CH_2)_8SiO_{1/2}$ | 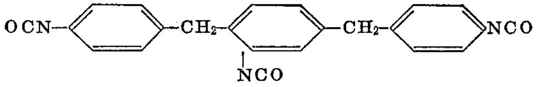 | $SiO_2(CH_3)_3SiO_{1/2}$<br>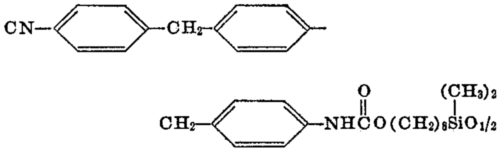 |
| $(C_2H_5)(HOCH_2)_2CCH_2O(CH_2)_3SiO_{3/2}$ | 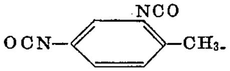 | 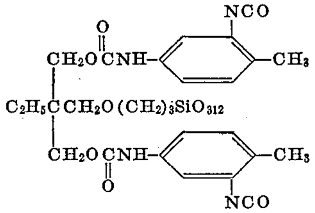 |

EXAMPLE 11

To a flask there was added 207 g. of

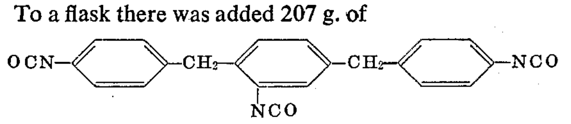

which was heated to about 60° C. after purging with nitrogen. Then 128 g. of $(CH_3O)_3SiCH_2CH_2SCH_2CH_2OH$ was slowly added via an addition funnel at a rate such that the temperature did not exceed 80° C. After the addition of the silane was complete the temperature was raised to 115°–120° C. by slowly heating over a ½ hour period. The temperature was held in this range for 1½ hours, then cooled to 80° C., and then diluted with dry toluene to obtain a 50% solids solution of

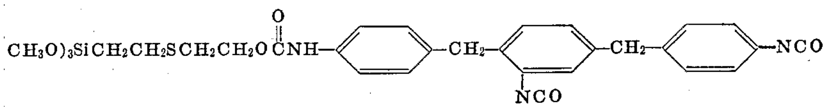

EXAMPLE 12

The procedure of Example 11 was repeated except that the isocyanate employed was

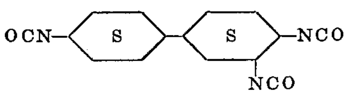

and the product obtained had the formula

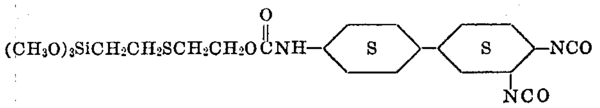

EXAMPLE 13

The procedure of Example 11 was repeated except that the isocyanate employed was

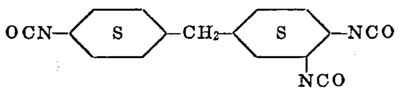

and the product obtained had the formula

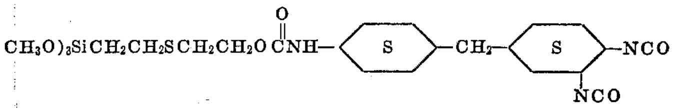

That which is claimed is:

1. A silane having the general formula $$\begin{matrix} R'_x \\ | \\ (RO)_{3-x}Si-A \end{matrix}$$

wherein

R is a hydrocarbon radical free of aliphatic unsaturation,

R' is a monovalent hydrocarbon radical free of aliphatic unsaturation, there being no more than 30 aliphatic carbon atoms and no more than 12 aromatic carbon atoms in the R and R' radicals, $x$ has a value of from 0 to 3, and A is a radical attached to the silicon atom via a silicon-carbon bond and which contains at least two isocyanato groups, there being at least two aliphatic carbon atoms whereby the A radical is attached to the silicon atom, and there being at least one $$-O\overset{O}{\overset{\|}{C}}NH- \text{ or } -S\overset{O}{\overset{\|}{C}}NH-$$

linkage, between the carbon atoms linking the A group to the silicon atom and the isocyanato groups of the A radical.

2. A sliane as defined in claim 1 wherein $x$ is 0 and R is an alkyl radical.

3. A silane as defined in claim 2 wherein R is a methyl radical.

4. A silane as defined in claim 3 which has the formula

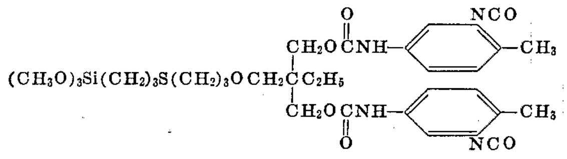

5. A silane as defined in claim 3 which has the formula

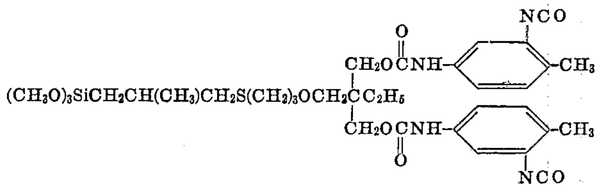

6. A silane as defined in claim 3 which has the formula

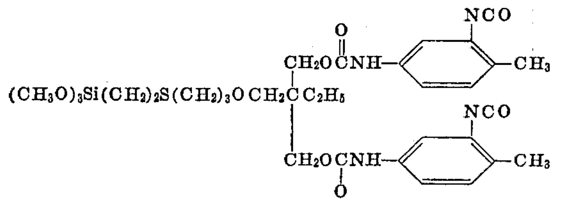

7. A silane as defined in claim 3 which has the formula

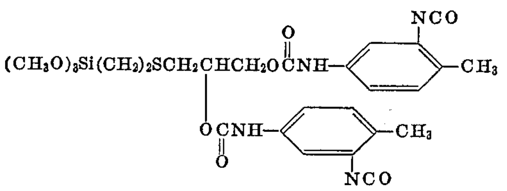

8. A silane as defined in claim 3 which has the formula

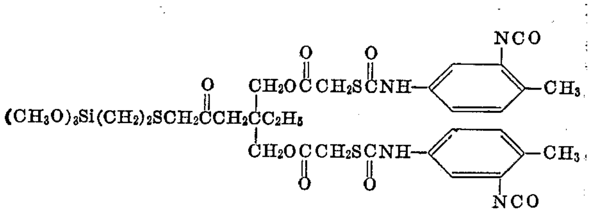

9. A silane as defined in claim 3 which has the formula

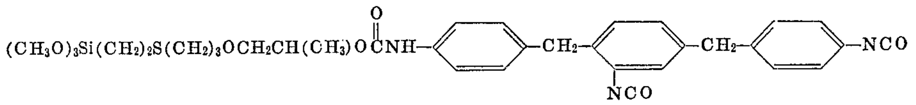

10. A silane as defined in claim 3 which has the formula

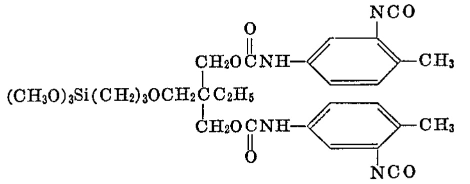

11. A silane as defined in claim 3 which has the formula

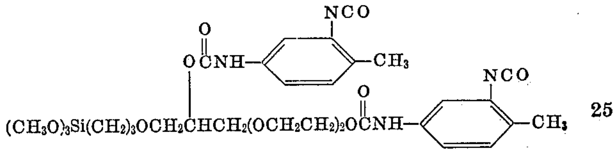

12. A silane as defined in claim 3 which has the formula

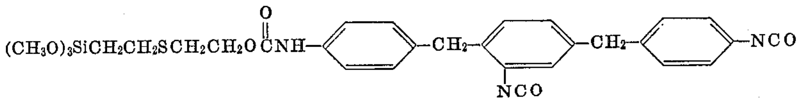

13. A silane as defined in claim 3 which has the formula

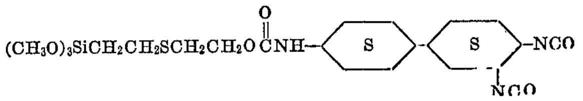

14. A siloxane containing units of the general formula $$O_{\frac{3-y}{2}}\overset{R'_y}{\overset{|}{Si}}-A$$

wherein

R′ is a monovalent hydrocarbon radical free of aliphatic unsaturation, there being no more than 30 aliphatic carbon atoms and no more than 12 aromatic carbon atoms in the R′ radical, $y$ has a value of from 0 to 2, and A is a radical attached to the silicon atom via a silicon-carbon bond and which contains at least two isocyanato group, there being at least two aliphatic carbon atoms between the silicon atom and the isocyanato groups, there being at least two aliphatic carbon atoms whereby the A radical is attached to the silicon atom, and there being at least one $$-O\overset{O}{\overset{\|}{C}}NH- \text{ or } -S\overset{O}{\overset{\|}{C}}NH-$$

linkage between the carbon atoms and the isocyanato groups of the A radicals.

15. A siloxane as defined in claim 14 wherein $y$ has an average value of about 1 and R′ is an alkyl radical.

16. A siloxane as defined in claim 15 wherein R′ is a methyl radical.

17. A siloxane as defined in claim 14 wherein $y$ is 0.

18. A siloxane containing units of the general formula $$O_{\frac{3-y}{2}}\overset{R'_y}{\overset{|}{Si}}-A$$

wherein

R′ is a monovalent hydrocarbon radical free of aliphatic unsaturation, there being no more than 30 aliphatic carbon atoms and no more than 12 aromatic carbon atoms in the R′ radical, $y$ has a value of from 0 to 2, and A is a radical attached to the silicon atom via a silicon-carbon bond and which contains at least two isocyanato groups, there being at least two aliphatic carbon atoms between the silicon atom and the isocyanato groups, there being at least two aliphatic carbon atoms whereby the A radical is attached to the silicon atom, and there being at least one $$-O\overset{O}{\overset{\|}{C}}NH- \text{ or } -S\overset{O}{\overset{\|}{C}}NH-$$

linkage between the carbon atoms linking the A group to the silicon atom and the isocyanato groups of the A radical, and siloxane units of the general formula $$R''_nSiO_{\frac{4-n}{2}}$$

R″ is selected from the group consisting of monovalent hydrocarbon and monovalent halogenated hydrocarbon radicals free of aliphatic unsaturation, and $n$ has a value from 0 to 3.

19. A siloxane as defined in claim 18 wherein $y$ has an average value of about 1, R′ is an alkyl radical, $n$ has an average value of about 2 and R″ is selected from the group consisting of the methyl, ethyl, phenyl and 3,3,3-trifluoropropyl radicals.

20. A siloxane as defined in claim 19 wherein R′ is a a methyl radical.

21. A siloxane as defined in claim 20 wherein R″ is a methyl radical.

22. A silane as defined in claim 3 which has the formula

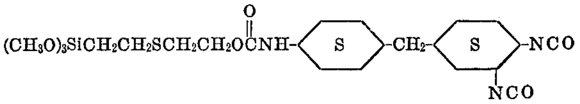

References Cited

UNITED STATES PATENTS

| | | | |
|---|---|---|---|
| 3,288,754 | 11/1966 | Green | 260—448.8 |
| 3,328,449 | 6/1967 | Haluska | 260—448.2 |
| 3,334,123 | 8/1967 | Culpepper | 260—448.8 |
| 3,389,160 | 6/1968 | Reid | 260—448.2 |
| 3,414,604 | 12/1968 | Pepe et al. | 260—448.8 |
| 3,426,057 | 2/1969 | Kanner | 260—448.2 |
| 3,440,261 | 4/1969 | Saam | 260—448.2 |

OSCAR R. VERTIZ, Primary Examiner

W. F. W. BELLAMY, Assistant Examiner

U.S. Cl. X.R.

260—448.2, 46.5